United States Patent
An et al.

(10) Patent No.: US 10,315,602 B2
(45) Date of Patent: Jun. 11, 2019

(54) INTEGRATED KNEE BOLSTER DEVICE FOR VEHICLE

(71) Applicants: Hyundai Motor Company, Seoul (KR); Kia Motors Corporation, Seoul (KR); Hyundai Mobis Co., Ltd., Seoul (KR)

(72) Inventors: Jae Hyun An, Seosan-si (KR); Il Sang Kim, Suwon-si (KR); Nam Seok Kim, Yongin-si (KR); Young Pyo Lee, Yongin-si (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 234 days.

(21) Appl. No.: 15/370,106

(22) Filed: Dec. 6, 2016

(65) Prior Publication Data

US 2018/0022302 A1    Jan. 25, 2018

(30) Foreign Application Priority Data

Jul. 19, 2016   (KR) .......................... 10-2016-0091184

(51) Int. Cl.
   *B60R 21/04*     (2006.01)
   *B60R 21/045*    (2006.01)
   *B60R 21/00*     (2006.01)

(52) U.S. Cl.
   CPC ............ *B60R 21/04* (2013.01); *B60R 21/045* (2013.01); *B60R 2021/0051* (2013.01); *B60R 2021/0414* (2013.01)

(58) Field of Classification Search
   CPC .................. B60R 21/04; B60R 21/045; B60R 2021/0051
   See application file for complete search history.

(56) References Cited

U.S. PATENT DOCUMENTS

| | | | | |
|---|---|---|---|---|
| 3,370,886 | A * | 2/1968 | Frost | B60R 19/40 244/121 |
| 6,604,780 | B2 * | 8/2003 | Lee | B60R 21/04 24/297 |
| 7,478,832 | B2 * | 1/2009 | Kong | B60R 21/04 280/748 |
| 9,751,485 | B2 * | 9/2017 | An | B60R 21/045 |
| 9,845,065 | B2 * | 12/2017 | An | B60R 21/045 |
| 2012/0068447 | A1 * | 3/2012 | An | B60R 21/045 280/752 |

FOREIGN PATENT DOCUMENTS

| | | |
|---|---|---|
| JP | 2007-176268 A | 7/2007 |
| KR | 10-2005-0027544 A | 3/2005 |
| KR | 10-2005-0099313 A | 10/2005 |
| KR | 10-2006-0007540 A | 1/2006 |
| KR | 10-2008-0018529 A | 2/2008 |
| KR | 10-2012-0029714 A | 3/2012 |
| KR | 10-2016-0054193 A | 5/2016 |

* cited by examiner

*Primary Examiner* — Faye M Fleming
(74) *Attorney, Agent, or Firm* — Morgan, Lewis & Bockius LLP

(57) ABSTRACT

An integrated knee bolster device for a vehicle is configured to restrict the depth of penetration of the knees of a seat occupant which strike a lower crash pad panel when a vehicle collision occurs, thus minimizing injury to the seat occupant, and enhancing safety performance for the seat occupant.

18 Claims, 7 Drawing Sheets

INTEGRATED KNEE BOLSTER DEVICE FOR VEHICLE

CROSS-REFERENCE TO RELATED APPLICATION

The present application claims priority to Korean Patent Application No. 10-2016-0091184 filed on Jul. 19, 2016, the entire contents of which are incorporated herein by reference.

BACKGROUND

Field of the Invention

The present invention relates to an integrated knee bolster device for a vehicle. More particularly, it relates to an integrated knee bolster device for a vehicle which minimizes injury to a seat occupant when a vehicle collision occurs, thus enhancing safety performance for the seat occupant.

Description of Related Art

Generally, when a vehicle that is traveling is involved in a collision, an occupant in the vehicle is pushed toward a crash pad disposed in the front of the vehicle by inertia.

Given this, vehicles are basically provided with airbags, seat belts, as safety devices for protecting occupants when a vehicle collision occurs.

Of the body of an occupant (a driver or a person on a passenger seat) in a vehicle, approximately portions above the abdominal region can be protected by an airbag or a seat belt, but there is a possibility of collision of the knees of the occupant with a cowl cross bar disposed inside and below the crash pad and with a lower crash pad panel forming a lower portion of the crash pad.

To prevent this problem, a knee bolster which is a knee protection device is typically provided inside the lower portion of the crash pad so as to reduce injury to the knees of the occupant.

A technology related to such a knee bolster introduces a knee protection device including: an outer panel made of plastic and formed in a "U" shape; an inner panel made of steel and formed in a "U" shape, the inner panel; being installed inside the outer panel such that space is formed inside the outer panel; and a shock absorption member installed in the space.

However, the outer panel made of plastic has a comparatively high brittleness for a load generated during a vehicle collision or for the depth of penetration of the knees of the occupant. Hence, when the outer panel is broken, the outer panel may make a sharp edge which may rather inflict injury on the knees. The inner panel made of steel may rather impede sufficient deformation of the shock absorption member.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an integrated knee bolster device for a vehicle which can restrict the depth of penetration of the knees of a seat occupant which strike a lower crash pad panel when a vehicle collision occurs, thus minimizing injury to the seat occupant, and enhancing safety performance for the seat occupant.

In one aspect, the present invention provides an integrated knee bolster device for a vehicle including: a shock absorption foam member installed to be supported by a cowl cross bar disposed behind a lower crash pad panel with which knees of a seat occupant collide when a vehicle collision occurs; and a lower-body-penetration-restriction support bracket installed between the lower crash pad panel and the cowl cross bar, wherein a first foam-member support bracket and a second foam-member support bracket are provided on a main bracket of the cowl cross bar and configured to support the shock absorption foam member.

In an exemplary embodiment, the lower-body-penetration-restriction support bracket may be disposed at a position opposite to the shock absorption foam member based on a longitudinal direction of the cowl cross bar.

In another exemplary embodiment, the cowl cross bar may include a main pipe and a sub-pipe that are coupled to each other by a center panel, and the sub-pipe may pass through the center panel and be inserted into a pipe assembly depression formed in a side surface of the shock absorption foam member.

In still another exemplary embodiment, the first foam-member support bracket may be provided at a predetermined position on the main bracket, be disposed parallel with the sub-pipe, and be inserted into a bracket assembly hole formed in the side surface of the shock absorption foam member. A clip may be installed in the side surface of the shock absorption foam member and configured to elastically fix an end of the first foam-member support bracket passing through the bracket assembly hole.

In yet another exemplary embodiment, the second foam-member support bracket may be installed to be supported on a bent rear end of the main bracket and support a rear surface of the shock absorption foam member.

In still yet another exemplary embodiment, the main bracket may be mounted to the center panel in a shape in which the sub-pipe passes through the main bracket, and be bonded to an outer circumferential surface of the main pipe.

In a further exemplary embodiment, of opposite ends of the lower-body-penetration-restriction support bracket, one end may be bonded to the cowl cross bar, and the other end may be coupled, along with a lower bracket of a junction box, to a mounting part of the lower crash pad panel. The junction box may have an upper bracket coupled to the cowl cross bar.

In another further exemplary embodiment, a reinforcing bracket for reinforcing strength may be installed on an upper portion of the lower-body-penetration-restriction support bracket.

In still another further exemplary embodiment, a composite-material sheet for reinforcing the lower crash pad panel may be provided on a rear surface of the lower crash pad panel in a region between the lower-body-penetration-restriction support bracket and the shock absorption foam member.

In yet another further exemplary embodiment, the composite-material sheet may include a continuous fiber composite material in which continuous fibers are impregnated in thermoplastics, and the strength of the composite-material sheet can be controlled by changing an arrangement pattern of the continuous fibers. When the lower crash pad panel is injection-molded in a state in which the composite-material sheet is inserted in a mold, injection material may be applied to even an upper end of a flange bent from an edge of the composite-material sheet so that the upper end of the flange is coated with the injection material.

In still yet another further exemplary embodiment, to bond the composite-material sheet to the rear surface of the lower crash pad panel through an ultrasonic fusion process, a plurality of fusion bosses may be provided on the rear surface of the lower crash pad panel, and a plurality of fusion holes to be assembled with the corresponding fusion bosses may be formed in the composite-material sheet.

In a still further exemplary embodiment, a sheet seating part may be formed on an outer circumferential surface of each of the fusion bosses, and protruding parts to be seated onto the corresponding sheet seating parts may be formed in the composite-material sheet on respective portions thereof in which the fusion holes are formed.

In still another further exemplary embodiment, when the fusion bosses are fused and bonded to the fusion holes through the ultrasonic fusion process, the lower crash pad panel and the composite-material sheet, except the sheet seating parts and the protruding parts, may be spaced apart from each other.

In still yet another further exemplary embodiment, positions at which the fusion bosses are disposed may be focused in the rear surface of the lower crash pad panel, on positions at which the knees of the seat occupant strike the lower crash pad panel when the vehicle collision occurs.

In still yet another further exemplary embodiment, the composite-material sheet may be formed by compression molding, and at least one elongated depression may be formed in the composite-material sheet so that the composite-material sheet is prevented from moving during the compression molding.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
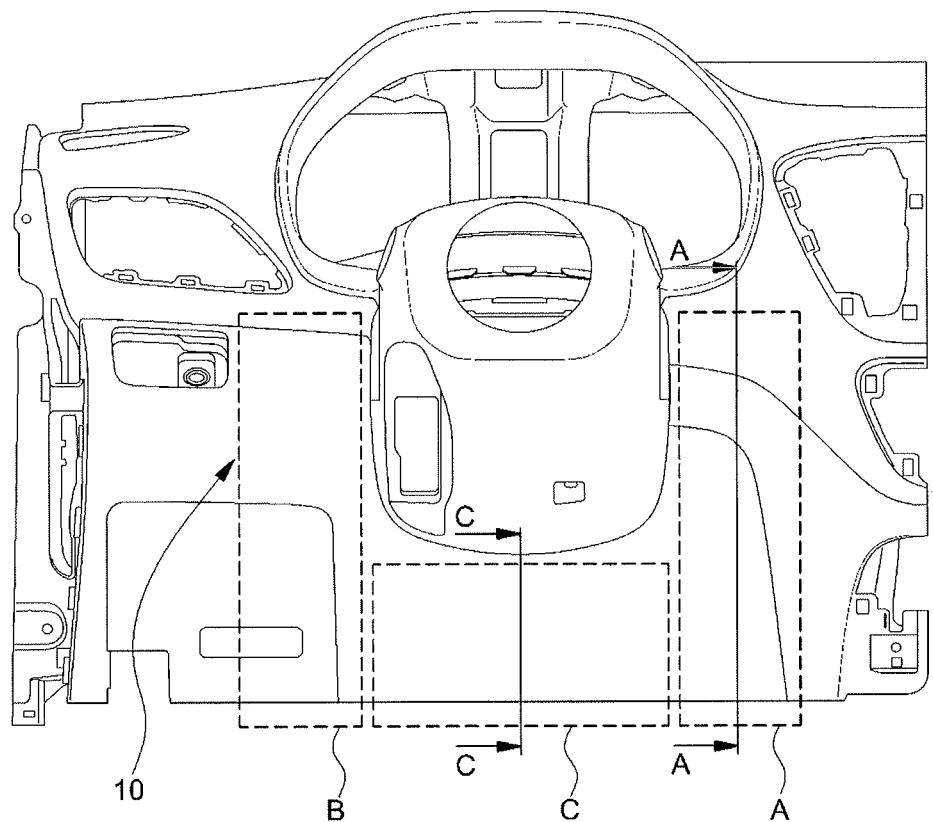
FIG. 1 is a view illustrating, from the interior of a vehicle, a lower crash pad panel behind which an integrated knee bolster device for vehicles according to an embodiment of the present invention is installed.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Further, in the following detailed description, names of constituents, which are in the same relationship, are divided into "the first", "the second", etc., but the present invention is not necessarily limited to the order in the following description.

Hereinafter, embodiments of the present invention will be described in detail with reference to the attached drawings.

FIG. 1 is a view illustrating, from the interior of a vehicle, a lower crash pad panel inside which an integrated knee bolster device for vehicles according to an embodiment of the present invention is installed. The optimum structure for minimizing, when a vehicle collision occurs, injury of a seat occupant who collides with the lower crash pad panel and thus securing the safety performance of the occupant will be divided into a region A, a region B, and a region C and separately described with regard to the regions A, B and C.

Figure 2:
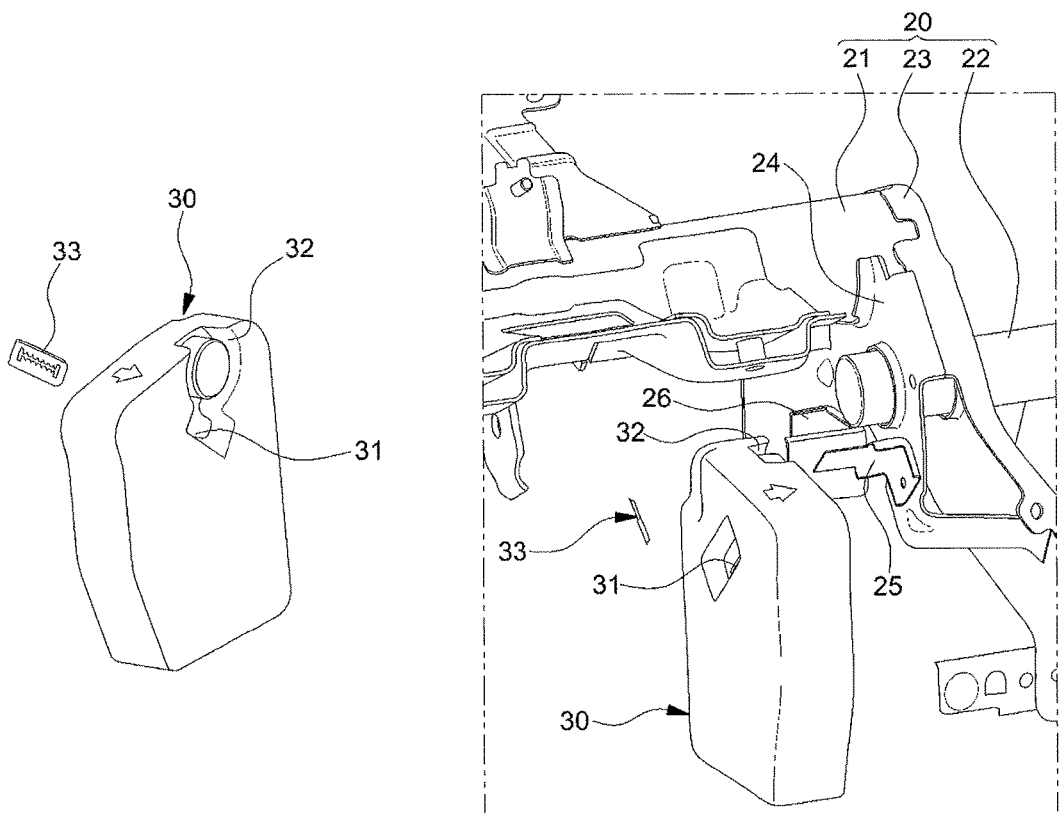
FIG. 2 is a view illustrating a collision load absorption structure disposed in a region A of FIG. 1.
Figure 3:
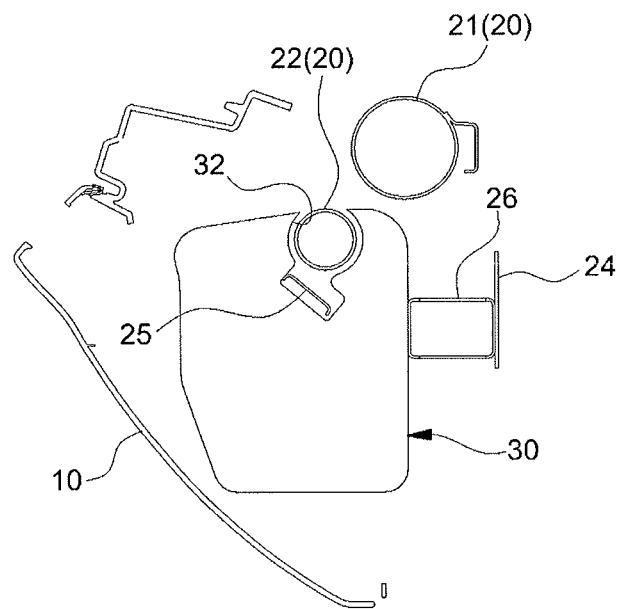
FIG. 3 is a sectional view taken along line A-A of FIG. 1.

FIG. 2 is a view illustrating a collision load absorption structure disposed in the region A of FIG. 1 among the regions behind the lower crash pad panel, and FIG. 3 is a sectional view taken along line A-A of FIG. 1.

In this regard, a vehicle body structure may include a cowl cross bar 20, which is disposed behind the lower crash pad panel 10 and is extended in a left-and-right direction of a vehicle body. The space defined ahead of the lower crash pad panel 10 may include an occupant's seat space of the vehicle. The space defined behind the lower crash pad panel 10 may include a space in which the cowl cross bar 20 is disposed.

The region A of FIG. 1 is a region with which approximately the right knee of a seat occupant collides when the vehicle collision occurs. As shown in FIGS. 2 and 3, a shock absorption foam member 30, which can absorb collision energy when the right knee penetrates the region A, is disposed in the region A of the space behind the lower crash pad panel 10.

The shock absorption foam member 30 is formed in a block shape having predetermined structure and size through a foaming process using a foaming agent made of expanded polypropylene (EPP). When the vehicle collision occurs, the shock absorption foam member 30 is deformed by a collision load of the knee of the seat occupant that penetrates the space behind the lower crash pad panel 10, thus absorbing collision energy applied to the lower body of the seat occupant.

The shock absorption foam member 30 is installed to be supported by a first foam-member support bracket 25 and a second foam-member support bracket 26 of a main bracket installed on the cowl cross bar 20.

The cowl cross bar 20 includes a main pipe 21 and a sub-pipe 22 which are coupled to each other by a center panel 23 such that the main pipe 21 and the sub-pipe 22 extend in the left and right directions. The main pipe 21 is disposed in the space behind the occupant's seat and the lower crash pad panel 10. The sub-pipe 22 is disposed at the right side of the main pipe 21 and in front of and below the main pipe 21.

Referring to FIG. 2, a main bracket 24 is mounted to (or integrally formed on) the center panel 23. The main bracket 24 is bonded to an outer circumferential surface of one side of the main pipe 21 and supported by the sub-pipe 22 in a shape in which the sub-pipe 22 passes through the main bracket 24.

The main bracket 24 includes the first foam-member support bracket 25 and the second foam-member support bracket 26 so as to support the shock absorption foam member 30.

The first foam-member support bracket 25 protrudes in an approximately plate shape from one side of the main bracket 24 in such a way that the first foam-member support bracket 25 is parallel with the sub-pipe 22 that passes through the center panel 23. The second foam-member support bracket 26 is a bracket having an approximately T shape and is mounted to the main bracket 24 at a position behind the first foam-member support bracket 25.

Referring to FIG. 3, the first foam-member support bracket 25 is located in front of and below the main pipe 21 and below the sub-pipe 22. The second foam-member support bracket 26 is located behind and below the main pipe 21 and the sub-pipe 22.

The first foam-member support bracket 25 supports the shock absorption foam member 30 in a shape in which it passes through a bracket assembly hole 31 formed in an upper portion of a side surface of the shock absorption foam member 30. In this regard, a clip 33 is provided on an end of the bracket assembly hole 31 (that is, in a side surface of the shock absorption foam member 30) so as to hold and fix the end of the first foam-member support bracket 25 passing through the bracket assembly hole 31.

The clip 33 has a hole structure such that the end of the first foam-member support bracket 25 is inserted into the clip 33 and thereby elastically fixed by the clip 33. In other words, when the end of the first foam-member support bracket 25 is forcibly inserted into the clip 33, the clip 33 is elastically deformed, whereby a restoring force is generated on the clip 33. The clip 33 holds and supports, using the restoring force, the end of the first foam-member support bracket 25.

Furthermore, a pipe assembly depression 32 is formed in the side surface of the shock absorption foam member 30 at a position adjacent to the bracket assembly hole 31. The end of the sub-pipe 22 passing through the main bracket 24 is inserted into the pipe assembly depression 32, thus supporting the shock absorption foam member 30 without the undesirable movement of the shock absorption foam member 30.

The pipe assembly depression 32 has an approximately annular shape so that both the outer circumferential surface and the inner circumferential surface of the sub-pipe 22 inserted into the pipe assembly depression 32 are supported by the pipe assembly depression 32.

The main bracket 24 includes a bent rear end having an L-shaped cross-sectional structure. The second foam-member support bracket 26 having ⊏-shaped cross-sectional structure is mounted to and supported by the bent portion of the main bracket 24 in such a way that the second foam-member support bracket 26 comes into close surface contact with the bent portion. In addition, the second foam-member support bracket 26 supports the rear surface of the shock absorption foam member 30 in a state in which they are brought into surface contact with each other.

That is, the second foam-member support bracket 26 is supported by the main bracket 24 and simultaneously supports the rear surface of the shock absorption foam member 30.

The shock absorption foam member 30 is installed such that the first foam-member support bracket 25 and the second foam-member support bracket 26 are inserted into the bracket assembly hole 31 and the pipe assembly depression 32. The side surface of the shock absorption foam member 30 is brought into surface contact with the main bracket 24.

As such, since the shock absorption foam member 30 is installed to be supported by the foam-member support brackets 25 and 26 and the sub-pipe 22 that are provided on the main bracket 24, the deformation of the shock absorption foam member 30 due to the right knee of the seat occupant striking and penetrating the lower crash pad panel 10 when the vehicle collision occurs, can be optimized. Thus, the shock absorption foam member 30 can reduce the depth of penetration of the right knee of the seat occupant as well as enhance collision energy absorption efficiency with respect to a collision load.

Figure 4:
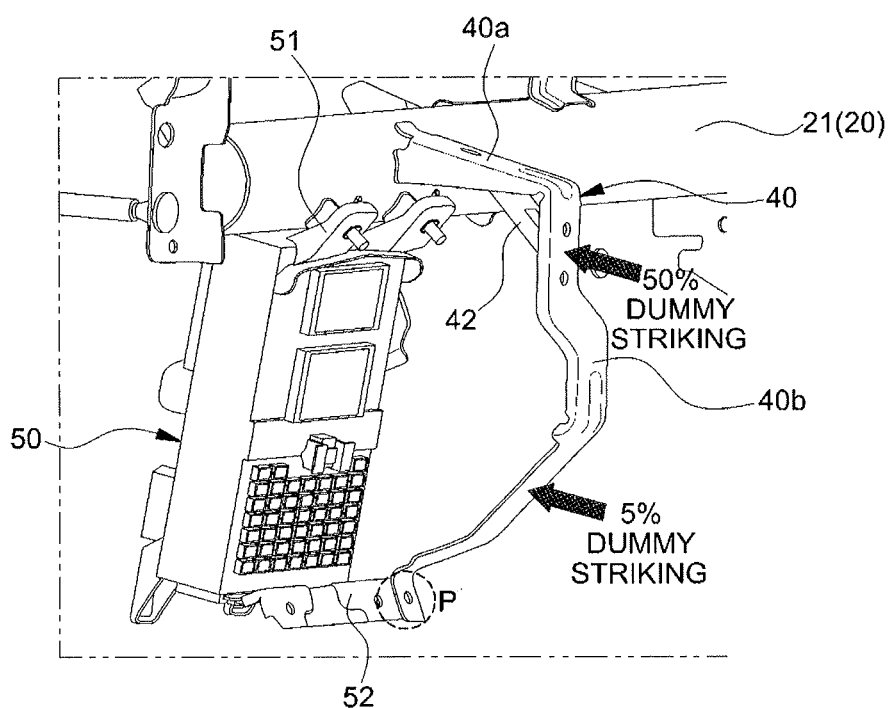
FIG. 4 and FIG. 5 are views illustrating a support structure that is disposed in a region B of FIG. 1 so as to restrict knee penetration.
Figure 5:
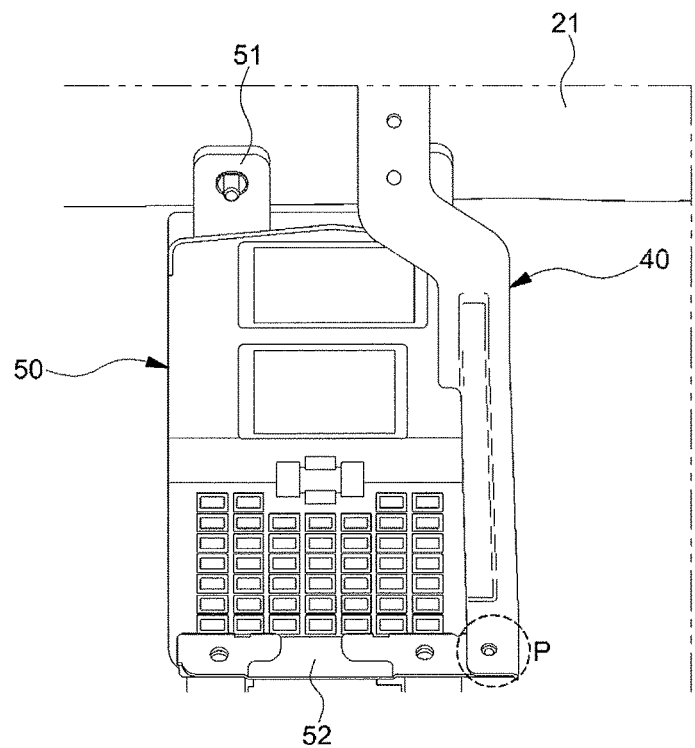

FIGS. 4 and 5 illustrate a support structure that is disposed in the region B of FIG. 1 in the space behind the lower crash pad panel 10 so as to restrict knee penetration.

The region B of FIG. 1 is a region with which approximately the left knee of a seat occupant collides when the vehicle collision occurs. As shown in FIGS. 4 and 5, a lower-body-penetration-restriction support bracket 40 is disposed in the region B of the space behind the lower crash pad panel 10 so as to reduce the depth of knee penetration and absorb a collision load during the vehicle collision.

The lower-body-penetration-restriction support bracket 40 is installed between the lower crash pad panel 10 and the cowl cross bar 20 disposed behind the lower crash pad panel 10. The lower-body-penetration-restriction support bracket 40 is disposed at a position opposite to the shock absorption foam member 30 based on the longitudinal direction of the cowl cross bar 20. In detail, as shown in FIGS. 4 and 5, of the opposite ends of the lower-body-penetration-restriction support bracket 40, one end is bonded to and supported by the main pipe 21 of the cowl cross bar 20, and the other end is coupled to and supported by a first side mounting part (see reference numeral 11a of FIG. 6) of the lower crash pad panel 10.

In the conventional art, if the bracket that supports the lower crash pad panel in the space behind the lower crash pad panel is excessively deformed by a collision with the knee of the seat occupant, the lower crash pad panel may be broken, thus causing abnormal movement of the seat occupant, thereby leading to an increase in the degree of injury of the seat occupant.

The lower-body-penetration-restriction support bracket 40 is installed to provide sufficient stiffness and structure capable of optimally restricting the depth of knee penetration when the vehicle collision occurs and thus preventing abnormal movement of the seat occupant's body. For example, as show in FIG. 4, the lower-body-penetration-restriction support bracket 40 includes an upper part 40a and a lower part 40b. The upper part 40a is coupled to the cowl cross bar 20 and formed to linearly extend a predetermined length. The lower part 40b integrally or monolithically extends from the upper part 40a to have an approximately smooth circular arc shape and is coupled to the first side mounting part 11a of the lower crash pad panel 10.

In this regard, an end of the lower-body-penetration-restriction support bracket 40 that is coupled to the mounting part 11a is coupled, along with a lower bracket 52 provided on a lower end of a junction box 50, to the first side mounting part 11a of the lower crash pad panel 10.

With regard to the junction box 50, an upper bracket 51 provided on an upper end of the junction box 50 is coupled to and supported by the cowl cross bar 20, and a lower bracket 52 provided on the lower end of the junction box 50 is coupled to and supported by opposite mounting parts (see reference numerals 11a and 11b of FIG. 6) of the lower crash pad panel 10. The lower bracket 52, along with the lower-body-penetration-restriction support bracket 40, is coupled to the first side mounting part 11a of the opposite mounting parts 11a and 11b.

In more detail, as shown in FIGS. 4 and 5, the end of the lower part 40b of the lower-body-penetration-restriction support bracket 40 and one end of the lower bracket 52 of the junction box 50 are coupled to the mounting part 11a of the lower crash pad panel 10 at a point P.

As such, since the lower-body-penetration-restriction support bracket 40 along with the lower bracket 52 of the junction box 50 is coupled to the lower crash pad panel 10, the lower-body-penetration-restriction support bracket 40 along with the junction box 50 can reduce the depth of knee penetration.

Furthermore, in order to restrict the depths of knee penetration of both an adult (or a 50% dummy) and a child (or a 5% dummy) who have different weights, heights, and the like, the lower-body-penetration-restriction support bracket 40 is provided with a reinforcing bracket 42 for reinforcing strength.

The lower-body-penetration-restriction support bracket 40 may be divided into the upper part 40a and the lower part 40b based on the bent portion thereof. Opposite ends of the reinforcing bracket 42 are respectively bonded (or coupled) to and supported by the upper part 40a and the lower part 40b. One end of the reinforcing bracket 42 is supported on an upper portion (approximately, a point at which the knee of an adult is hit, refer to FIG. 4) of the lower part 40b.

In other words, the reinforcing bracket 42 is installed to be located behind an upper portion of the lower crash pad panel 10 and at the upper portion of the lower-body-penetration-restriction support bracket 40.

As such, since the reinforcing bracket 42, along with the lower-body-penetration-restriction support bracket 40, is installed, the knee bolster device can appropriately reduce both the depth of knee penetration of the adult (or the 50% dummy) striking the upper portion of the support bracket 40 and the depth of knee penetration of the child (or the 5% dummy) striking the lower portion of the support bracket 40. As the depth of knee penetration of the seat occupant during the vehicle collision is reduced, the distance that the pelvis of the seat occupant moves is reduced, whereby injury of the seat occupant can be minimized.

Hereinbelow, a collision load absorption structure disposed in the region C of FIG. 1 will be described.

Figure 6:
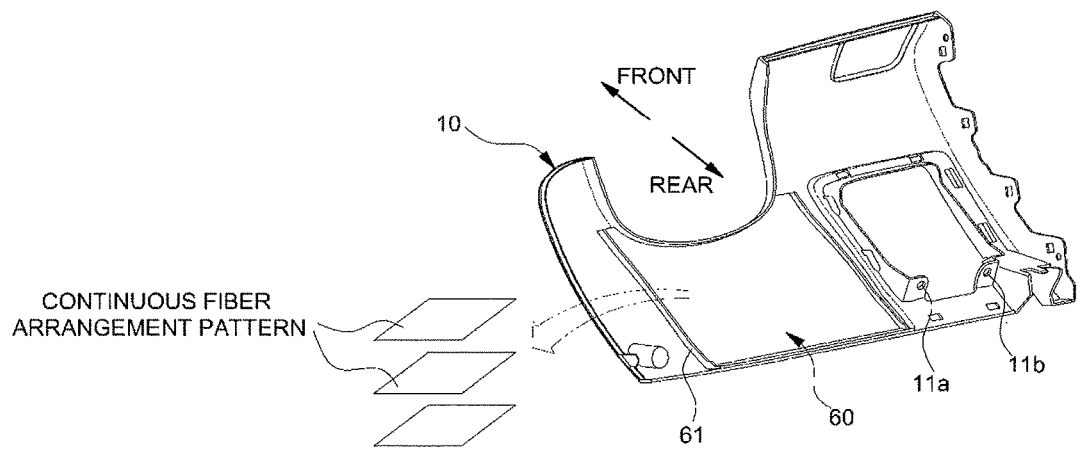
FIG. 6 is a view illustrating a composite-material sheet installed on a rear surface of the lower crash pad panel in a region C of FIG. 1.
Figure 7:
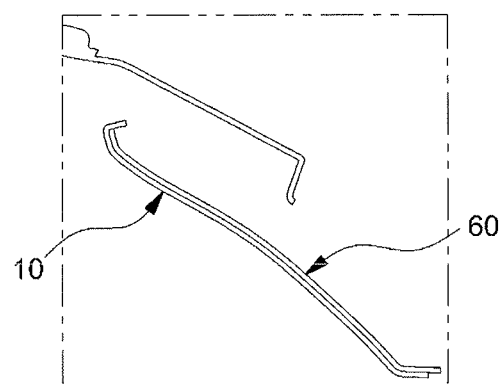
FIG. 7 is a sectional view taken along line C-C of FIG. 1.
Figure 8:
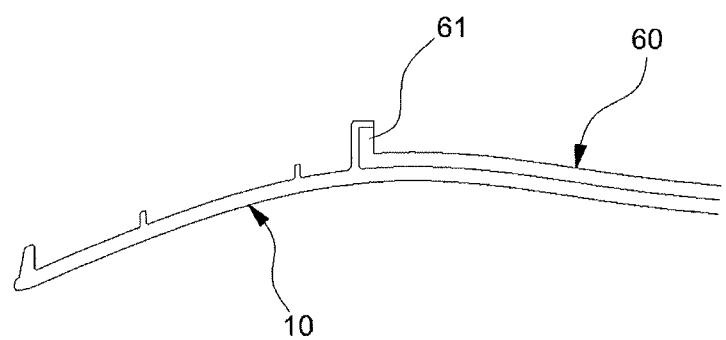
FIG. 8 is a view showing a structure in which an injection material of the lower crash pad panel is coated on even an upper end of a flange of the composite-material sheet according to the embodiment of the present invention.

FIG. 6 is a view illustrating a composite-material sheet installed on the rear surface of the lower crash pad panel in the region C of FIG. 1. FIG. 7 is a sectional view taken along line C-C of FIG. 1. FIG. 8 is a view showing a structure in which an injection material (injection resin) of the lower crash pad panel is coated on even an upper end of a flange of the composite-material sheet when the lower crash pad panel, in which the composite-material sheet is used as an insert material, is injection-molded.

As shown in FIG. 6, the composite-material sheet 60 for reinforcing the lower crash pad panel 10 is provided on the rear surface of the lower crash pad panel 10. The composite-material sheet 60 is disposed in a region between the lower-body-penetration-restriction support bracket 40 and the shock absorption foam member 30, that is, in the region C of FIG. 1.

The composite-material sheet 60 uniformly distributes loads applied to the left and right legs of the seat occupant when the knees of the seat occupant strike the lower crash pad panel 10 during the vehicle collision, thus making it possible to control the balance of the loads applied to the left and right knees of the seat occupant. Furthermore, even though the knees of the seat occupant do not precisely strike the front portions of the shock absorption foam member 30 and the lower-body-penetration-restriction support bracket 40, the composite-material sheet 60 makes it possible for the shock absorption foam member 30 and the lower-body-penetration-restriction support bracket 40 to restrict the depth of knee penetration and absorb shock over a wide area.

The composite-material sheet 60 can be mounted to the rear surface of the lower crash pad panel 10 by a separate coupling member or by thermal bonding, vibration bonding, or the like. In addition, the composite-material sheet 60 may be integrally or monolithically formed on the rear surface of the lower crash pad panel 10 through an insert injection molding process.

The composite-material sheet 60 may be made of continuous fiber thermoplastics (CFT) capable of enhancing the stiffness of the lower crash pad panel 10.

The CFT is composite material formed of continuous fibers and thermoplastics and is formed such that continuous fibers (long fibers) impregnated in thermoplastics are stacked to have a multi-layer structure.

In this regard, glass fiber (GF), carbon fiber (CF), etc. may be used as continuous fiber. Polypropylene (PP), polyamide (PA), polyethylene terephthalate (PET), etc. may be used as the thermoplastics.

This continuous fiber composite-material is formed in a shape in which continuous fibers are impregnated in a thermoplastic material in a predetermined arrangement pattern. The stiffness and strength of the continuous fiber composite-material, that is, the composite-material sheet 60, can be controlled by changing the arrangement pattern of the continuous fibers.

For example, the continuous fiber composite-material may be formed in such a way that continuous fibers are woven with one another in a manner similar to a mesh to have a fabric shape, and the woven-shaped continuous fibers are stacked in a multi-layer structure in thermoplastics. That is, the continuous fiber composite-material may be formed in such a way that horizontal continuous fibers extending in the horizontal direction and vertical continuous fibers extending in the vertical direction are woven with each other in a fabric shape, and the woven-shaped continuous fibers are stacked in a multi-layer structure in thermoplastics.

In another example, the continuous fiber composite-material may be formed in such a way that continuous fibers that are arranged in one direction on each layer on a plane are stacked such that they are perpendicular to each other between adjacent layers and thus continuous fibers impregnated in thermoplastics form a perpendicular structure.

In still another example, the continuous fiber composite-material may be formed in such a way that continuous fibers extending in an inclined direction form a woven-shaped or perpendicular structure in thermoplastics.

Such continuous fibers included in the thermoplastics may be arranged in various directions, including a horizontal direction (a transverse direction), a vertical direction (a longitudinal direction), an inclined direction (a direction forming an arbitrary inclined angle with respect to a horizontal direction or a vertical direction), etc. based on the left and right directions of the vehicle. The strength of the composite-material sheet 60 may be designed to be optimized by controlling the arrangement pattern of continuous fibers.

In the case where the lower crash pad panel 10 is formed by injection molding using the composite-material sheet 60 as an insert, there is a need of a process for preventing fine fibers from being exposed out of the edge of the composite-material sheet 60 because of characteristics of continuous fiber composite material.

The lower crash pad panel 10 may be formed by an injection molding method using a polymer material such as polypropylene mineral filled (PPF) material. When the lower crash pad panel 10 is injection-molded, the preformed composite-material sheet 60 is used as an insert material and integrally formed in the rear surface of the lower crash pad panel 10, thus reinforcing the lower crash pad panel 10.

In this regard, fine fibers impregnated in the thermoplastics may be exposed from the edge of the composite-material sheet 60 formed by cutting. In this case, the exposed fine fibers may cause an injury or be harmful to the human body. In order to prevent this problem, when the lower crash pad panel 10 is injection-molded, injection material is applied to even the upper end of a flange 61 which is formed to be bent from the edge of the composite-material sheet 60, such that the upper end of the flange 61 is coated with the injection material.

The flange 61 is formed to be approximately perpendicularly bent from the edge of the composite-material sheet 60 formed in a planar shape. Since the composite-material sheet 60 is integrally formed with the lower crash pad panel 10, the flange 61 forms a structure protruding from the rear surface of the lower crash pad panel 10.

Therefore, in an exemplary embodiment of the present invention, a leakage gap for injection material is intentionally formed at a position at which the flange 61 of the composite-material sheet 60 is located in a mold in which the composite-material sheet 60 is inserted during the injection molding process of the lower crash pad panel 10. When the injection material is injected into the mold, it flows over the flange 61 and thus is applied and coated to even the upper end of the flange 61. Thus, fine fibers can be prevented from being exposed out of the coated portions.

The integrated knee bolster device according to an exemplary embodiment of the present invention having the above-mentioned configuration can have knee penetration restriction performance of a level equal to or higher than the conventional knee bolster device using the knee bolster panel and bracket that are made of steel. In addition, the integrated knee bolster device according to an exemplary embodiment of the present invention can realize simplification in structure and reduction in the number of parts, thereby providing effects such as reductions in the weight, the production cost, and the number of manufacturing processes.

Hereinafter, one embodiment of an assembly structure of a composite-material sheet 62 and a lower crash pad panel 12 will be described with reference to FIGS. 9 to 11.

The composite-material sheet 62 may be coupled and fixed to the rear surface of the lower crash pad panel 12 by ultrasonic fusion.

Figure 9:
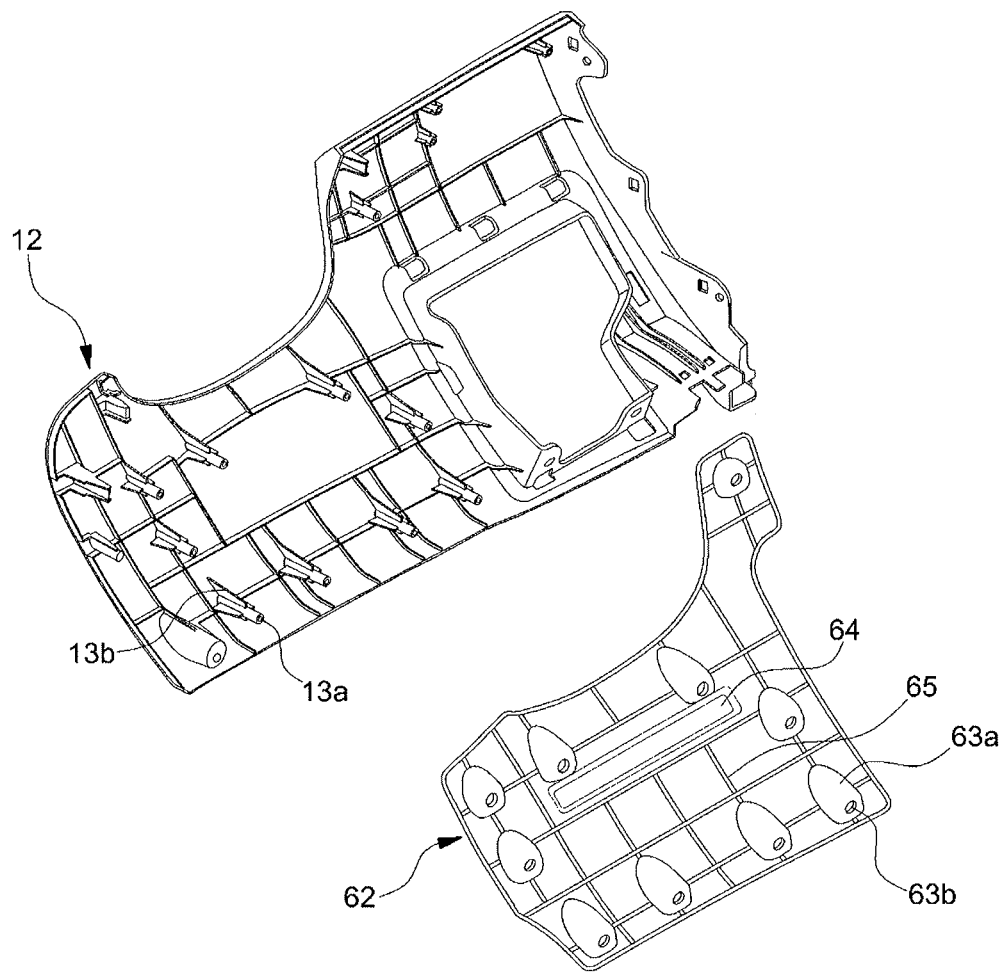
FIG. 9 is a view illustrating a lower crash pad panel and a composite-material sheet according to another embodiment of the present invention.

For this, as shown in FIG. 9, a plurality of fusion bosses 13a are provided on the rear surface of the lower crash pad panel 12, and a plurality of fusion holes 63b are provided on the composite-material sheet 62 so that the fusion bosses 13a are inserted into and assembled with the respective fusion holes 63b.

In detail, the fusion bosses 13a protrude from the rear surface of the lower crash pad panel 12. A sheet seating part 13b extending in a radial direction is provided on the outer circumferential surface of each of the fusion bosses 13a. In the composite-material sheet 62, protruding parts 63a to be seated onto the corresponding sheet seating parts 13b are provided on respective portions in which the fusion holes 63b are formed.

In other words, the fusion bosses 13a having the sheet seating parts 13b protrude from the rear surface of the lower crash pad panel 12. The protruding parts 63a having the fusion holes 63b are formed on the composite-material sheet 62 in a shape in which each of the protruding parts 63a can be seated on the corresponding sheet seating parts 13b.

Each sheet seating part 13b is formed such that the corresponding protruding part 63a can be seated on the sheet seating part 13b in a state in which the associated fusion boss 13a is inserted into the corresponding fusion hole 63b. That is, the sheet seating part 13b is formed on only a lower portion of the fusion boss 13a, thus allowing an upper end of the fusion boss 13a to pass through the fusion hole 63b. The length to which the fusion boss 13a passes through the fusion hole 63b is determined in consideration of the amount with which the fusion boss 13a is fused.

Figure 10:
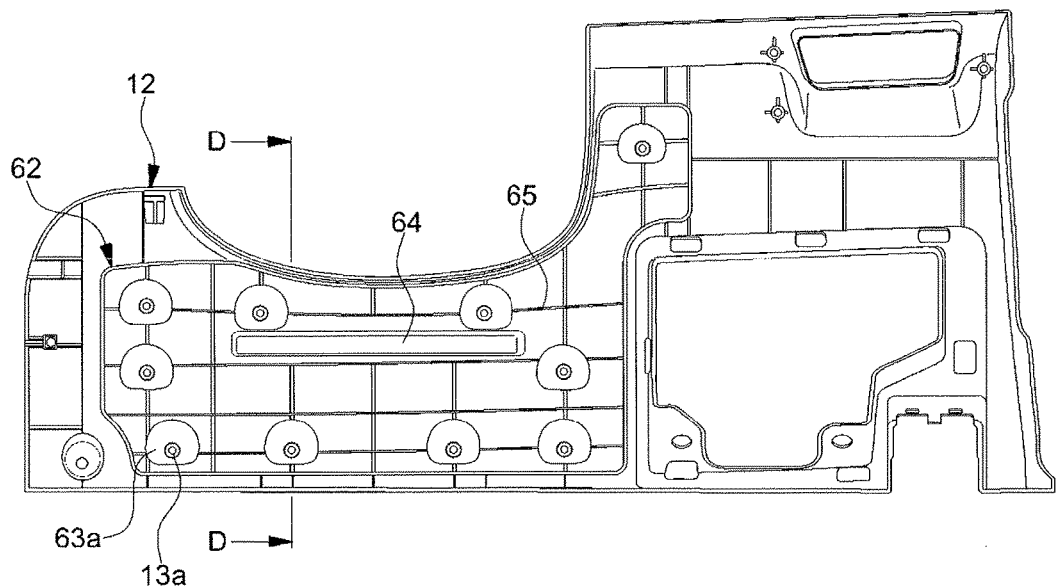
FIG. 10 is a view showing a rear surface of the lower crash pad panel assembled with the composite-material sheet according to the embodiment of FIG. 9.
Figure 11:
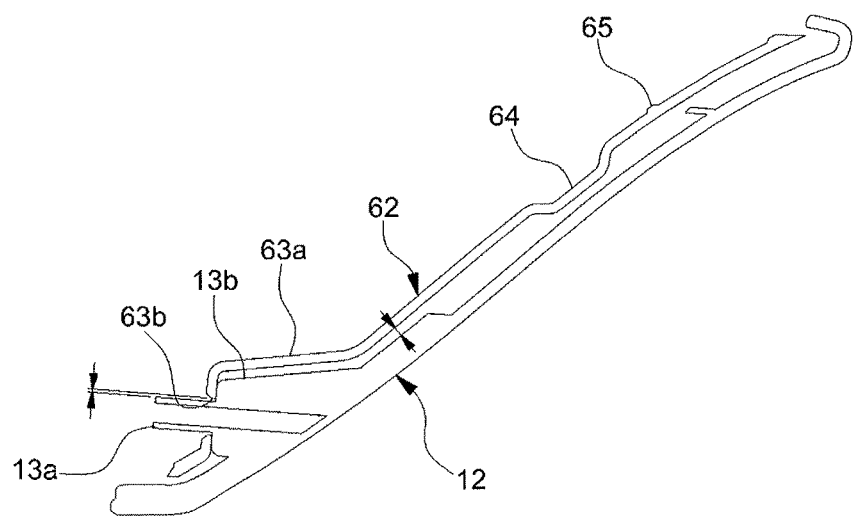
FIG. 11 is a sectional view taken along line D-D of FIG. 10.

As shown in FIGS. 10 and 11, after the fusion bosses 13a are inserted into the respective fusion holes 63b and the protruding parts 63a are seated on the respective sheet seating parts 13b, the upper ends of the fusion bosses 13a are fused using an ultrasonic fusion apparatus. Then, the fusion bosses 13a are fused and thus bonded to the corresponding fusion holes 63b and the associated protruding parts 63a around the fusion holes 63b. Consequently, the composite-material sheet 62 is bonded to the lower crash pad panel 12.

For the ultrasonic fusion, each fusion hole 63b has a diameter less than that of the corresponding fusion boss 13a by a predetermined size.

In this regard, when the composite-material sheet 62 is bonded to the lower crash pad panel 12, only portions of the composite-material sheet 62 that are fused to the lower crash pad panel 12, that is, only the protruding parts 63a having the respective fusion holes 63b therein, are brought into contact with the lower crash pad panel 12 by the sheet seating parts 13b. The other portion of the composite-material sheet 62 except the protruding parts 63a is spaced apart from the lower crash pad panel 12 by a predetermined distance (refer to FIG. 11).

That is, the remaining parts of the lower crash pad panel 12 and the composite-material sheet 62, except the sheet seating parts 13b and the protruding parts 63a, are bonded to each other such that they are spaced apart from each other.

Therefore, the optimum size of the composite-material sheet 62 in a structure in which it can be bonded to the lower crash pad panel 12, can be secured. Since the distance between the composite-material sheet 62 and the lower crash pad panel 12 is maintained except the contact portions (the protruding parts) for fusion, generation of noise due to contact therebetween can be minimized.

As such, because the ultrasonic fusion method is used to bond the composite-material sheet 62 to the rear surface of the lower crash pad panel 12, the numbers of parts and manufacturing processes for coupling of the composite-material sheet 62 to the lower crash pad panel 12 can be reduced, compared to those of the conventional assembly method using separate coupling members.

Furthermore, the positions at which the fusion bosses 13a are located are focused in the rear surface region of the lower crash pad panel 12, on positions at which the knees of the seat occupant mainly strike the lower crash pad panel 12 when the vehicle collision occurs. Hence, the number of fusion points for bonding between the composite-material sheet 62 and the lower crash pad panel 12 can be comparatively reduced.

In the case of the composite-material sheet 62, because there is the probability of occurrence of a defect in the protruding parts 63 when a pressing process is performed, a compression molding process may be preferably used to form the composite-material sheet 62.

However, when the composite-material sheet 62 is compression-molded in a preheated mold, the composite-material sheet 62 may be moved to the left or the right. Therefore, to prevent the composite-material sheet 62 from undesirably moving in the mold during the compression-molding process, an elongated depression 64 extending a predetermined length in a left-right transverse direction of the composite-material sheet 62 is formed in the composite-material sheet 62.

As the vertical width of the composite-material sheet 62 is increased, the number of elongated depressions 64 may be increased. The elongated depression 64 has a shape in which it is depressed in the direction opposite to the protruding direction of the protruding parts 63.

Furthermore, a grid reinforcing rib 65 for enhancing the strength of the composite-material sheet 62 is formed on one surface of the composite-material sheet 62, thus making it possible to reduce the thickness of the composite-material sheet 62.

An integrated knee bolster device for a vehicle according to an exemplary embodiment of the present invention restricts the depth of penetration of the knees of a seat occupant which strike a lower crash pad panel and penetrate space behind the lower crash pad panel when a vehicle collision occurs, thus preventing abnormal movement of the seat occupant. Thus, the risk of injury to the seat occupant can be minimized, and thus the safety performance for the seat occupant can be enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated knee bolster device for a vehicle comprising:
    a shock absorption foam member configured to be supported by a cowl cross bar disposed behind a lower crash pad panel with which knees of a seat occupant collides when a vehicle collision occurs; and
    a lower-body-penetration-restriction support bracket installed between the lower crash pad panel and the cowl cross bar,
    wherein a foam-member support bracket is provided on a main bracket of the cowl cross bar and configured to support the shock absorption foam member, and
    wherein a composite-material sheet for reinforcing the lower crash pad panel is provided on a rear surface of the lower crash pad panel in a region between the lower-body-penetration-restriction support bracket and the shock absorption foam member.

2. The integrated knee bolster device of claim 1, wherein the cowl cross bar comprises a main pipe and a sub-pipe that are coupled to each other by a center panel, and the sub-pipe passes through the center panel and is inserted into a pipe assembly depression formed in a side surface of the shock absorption foam member.

3. The integrated knee bolster device of claim 2, wherein the foam-member support bracket comprises a first foam-member support bracket and a second foam-member support bracket, and the first foam-member support bracket is provided at a side of the main bracket and disposed parallel with the sub-pipe, the first foam-member support bracket being inserted into a bracket assembly hole formed in the side surface of the shock absorption foam member.

4. The integrated knee bolster device of claim 3, wherein a clip is installed in the side surface of the shock absorption foam member and configured to elastically fix an end of the first foam-member support bracket passing through the bracket assembly hole.

5. The integrated knee bolster device of claim 3, wherein the second foam-member support bracket is configured to be supported on a bent rear end of the main bracket and supports a rear surface of the shock absorption foam member.

6. The integrated knee bolster device of claim 2, wherein the main bracket is mounted to the center panel in a shape in which the sub-pipe passes through the main bracket, the main bracket being bonded to an outer circumferential surface of the main pipe.

7. The integrated knee bolster device of claim 1, wherein, of opposite ends of the lower-body-penetration-restriction support bracket, a first end thereof is bonded to the cowl cross bar, and a second end thereof is coupled, along with a lower bracket of a junction box, to a mounting part of the lower crash pad panel, the junction box having an upper bracket coupled to the cowl cross bar.

8. The integrated knee bolster device of claim 1, wherein a reinforcing bracket for reinforcing strength is installed on an upper portion of the lower-body-penetration-restriction support bracket.

9. The integrated knee bolster device of claim 1, wherein the composite-material sheet comprises a continuous fiber composite material in which continuous fibers are impregnated in thermoplastics, and strength of the composite-material sheet is controlled by changing an arrangement pattern of the continuous fibers.

10. The integrated knee bolster device of claim 1, wherein, when the lower crash pad panel is injection-molded, injection material is applied to an upper end of a flange bent from an edge of the composite-material sheet so that the upper end of the flange is coated with the injection material.

11. The integrated knee bolster device of claim 1, wherein a plurality of fusion bosses are provided on the rear surface of the lower crash pad panel, and a plurality of fusion holes to be assembled with the corresponding fusion bosses are formed in the composite-material sheet.

12. The integrated knee bolster device of claim 11, wherein a sheet seating part is formed on an outer circumferential surface of each of the fusion bosses, and protruding parts to be seated onto the corresponding sheet seating parts are formed in the composite-material sheet on respective portions thereof in which the fusion holes are formed.

13. The integrated knee bolster device of claim 12, wherein the lower crash pad panel and the composite-material sheet, except the sheet seating parts and the protruding parts, are spaced apart from each other.

14. The integrated knee bolster device of claim 11, wherein the fusion bosses are fused by ultrasonic fusion and bonded to the corresponding fusion holes.

15. The integrated knee bolster device of claim 11, wherein positions at which the fusion bosses are disposed are focused in the rear surface of the lower crash pad panel, on positions at which the knees of the seat occupant strike the lower crash pad panel when the vehicle collision occurs.

16. The integrated knee bolster device of claim 11, wherein a reinforcing rib for reinforcing strength is formed on the composite-material sheet.

17. The integrated knee bolster device of claim 11, wherein the composite-material sheet is formed by compression molding, and at least one elongated depression is formed in the composite-material sheet so that the composite-material sheet is prevented from moving during the compression molding.

18. The integrated knee bolster device of claim 1, wherein the lower-body-penetration-restriction support bracket is disposed at a position opposite to the shock absorption foam member based on a longitudinal direction of the cowl cross bar.

* * * * *